(12) United States Patent
Brundisini et al.

(10) Patent No.: US 7,701,691 B2
(45) Date of Patent: Apr. 20, 2010

(54) CONTROL DEVICE FOR DRIVING AC SOLENOIDS AND DC BISTABLE SOLENOIDS, SPECIFICALLY FOR ELECTROVALVES OF IRRIGATION SYSTEMS

(75) Inventors: Andrea Brundisini, Bologna (IT); Franco Milan, Caneva (IT)

(73) Assignee: Claber S.p.A., Fiume Veneto (PN) (IT)

( * ) Notice: Subject to any disclaimer, the term of this patent is extended or adjusted under 35 U.S.C. 154(b) by 490 days.

(21) Appl. No.: 11/806,350

(22) Filed: May 31, 2007

(65) Prior Publication Data
US 2007/0279828 A1 Dec. 6, 2007

(30) Foreign Application Priority Data
May 31, 2006 (IT) ............... MI06A1059

(51) Int. Cl.
*H01H 47/00* (2006.01)
(52) U.S. Cl. ..................................... 361/160
(58) Field of Classification Search ................. 361/160
See application file for complete search history.

(56) References Cited

U.S. PATENT DOCUMENTS

| 3,885,165 A | * | 5/1975 | Franks et al. | ............... 307/115 |
|---|---|---|---|---|
| 3,918,636 A | | 11/1975 | Dawson | |
| 3,961,200 A | * | 6/1976 | Dute | ............... 307/112 |
| 4,558,391 A | * | 12/1985 | Ward et al. | ............... 361/155 |
| 4,630,166 A | | 12/1986 | D'Onofrio | |
| 5,740,031 A | * | 4/1998 | Gagnon | ............... 700/16 |
| 5,835,331 A | | 11/1998 | Shuey | |
| 5,859,499 A | | 1/1999 | McAfee et al. | |
| 6,583,997 B1 | * | 6/2003 | Reid et al. | ............... 363/50 |

OTHER PUBLICATIONS

EP Search Report dated Apr. 17, 2009.

\* cited by examiner

*Primary Examiner*—Stephen W Jackson
(74) *Attorney, Agent, or Firm*—Jacobson Holman PLLC

(57) ABSTRACT

There is described a control device that allows to drive both AC solenoids and DC bistable solenoids. The control device comprises power supply terminals which may selectively be connected to an AC or DC voltage source, load terminals which may be connected to a driven solenoid, at least one triac device connected in series to said driven solenoid, means which may be controlled to switch on said triac. There are further provided selector means interposed between said power supply terminals and said load terminals to switch the control device between a first configuration suitable for the power supply of an AC solenoid and a second configuration suitable for the power supply of a DC bistable solenoid and inverter means which may be controlled to invert the voltage polarity at the load terminals with respect to that applied at the power supply terminals when the control device (1) is selected in said second configuration.

9 Claims, 4 Drawing Sheets

CONTROL DEVICE FOR DRIVING AC SOLENOIDS AND DC BISTABLE SOLENOIDS, SPECIFICALLY FOR ELECTROVALVES OF IRRIGATION SYSTEMS

The present invention relates to a control device for driving AC solenoids and DC bistable solenoids, specifically for electrovalves of irrigation systems for lawns, gardens, vegetable gardens and so on.

One of the greatest problems in the design of a centralised irrigation system is related to how much the latter is capable of adapting to the particular conditions of the ground that needs to be irrigated. Different kinds of systems are chosen depending on whether parks, gardens, sports facilities or farming land need to be irrigated.

Often it has been required to design a system according to a specially devised plan in order to satisfy the needs of the client: it is clear that engineering costs follow which considerably affect the total cost of the system, thus reducing competitiveness and profit.

Furthermore, the required wiring is usually very significant and sometimes implies difficulties in the steps of installation, test and maintenance and in the following extension of the system. It is indeed common that installation technicians and gardeners are not experts in electrical systems.

For these reasons, the market of products for centralised irrigation systems develops in the direction of ever increasing standardisation and component modularity levels, so that these are marketable sight unseen and may be installed as a whole without causing difficulties to the installers.

An application of this concept may be represented, for instance, by a control device for irrigation systems which is capable of driving without distinction the two kinds of currently used electrovalves, i.e. AC solenoid electrovalves or DC bistable electrovalves.

In irrigation systems, the choice of the electrovalves depends on various factors, related to the typical characteristics of the electrovalves and to the kind and distribution of the irrigation system.

Usually, electrovalves having an AC solenoid are cost-effective; furthermore, they display appropriate safety levels because, in the case of malfunctioning, they tend to close, thus interrupting the flow of water. On the other hand, they require an AC power supply system providing appropriate power, and thus require high management costs and the closeness to an electric network.

Electrovalves having a DC bistable solenoid are instead more expensive; furthermore, they are less safe because, in case of the interruption of the electric connection between the control device and the electrovalve, the latter remains in the state in which it was before the interruption, therefore also open. On the other side, they require less power and may be supplied by a battery or by solar cells, as bistable solenoids do not require energy but for the transition from one state to the other.

Currently, the control devices for irrigation systems are in turn of a different kind depending on the type of electrovalves employed in the system itself. That is, there is no control device which may be used without distinction for electrovalves having an AC solenoid or a DC bistable solenoid.

It is the object of the present invention to design a control device allowing to drive without distinction AC solenoids or DC bistable solenoids, and thus electrovalves for irrigation systems having solenoids of one or the other kind.

According to the invention such an object is achieved by a control device for driving solenoids of the AC or DC bistable type, characterised in that it comprises power supply terminals which may be connected selectively to an AC or DC voltage source, load terminals which may be connected to a driven solenoid, at least one triac device connected in series to said driven solenoid, means which may be controlled to switch on said triac and selection means interposed between said power supply terminals and said load terminals to switch the control device between a first configuration suitable for the power supply of an AC solenoid and a second configuration suitable for the power supply of a DC bistable solenoid and inverter means which may be controlled to invert the polarity of the voltage at the load terminals with respect to that applied to the supply terminals when the control device is selected in said second configuration.

In this manner, an AC solenoid or a DC bistable solenoid may be connected without distinction to the load terminals of the control device itself.

These and other characteristics of the present invention will become more apparent from the following detailed description of some examples of embodiment shown by no way of limitation in the accompanying drawings, in which.

Figure 1:
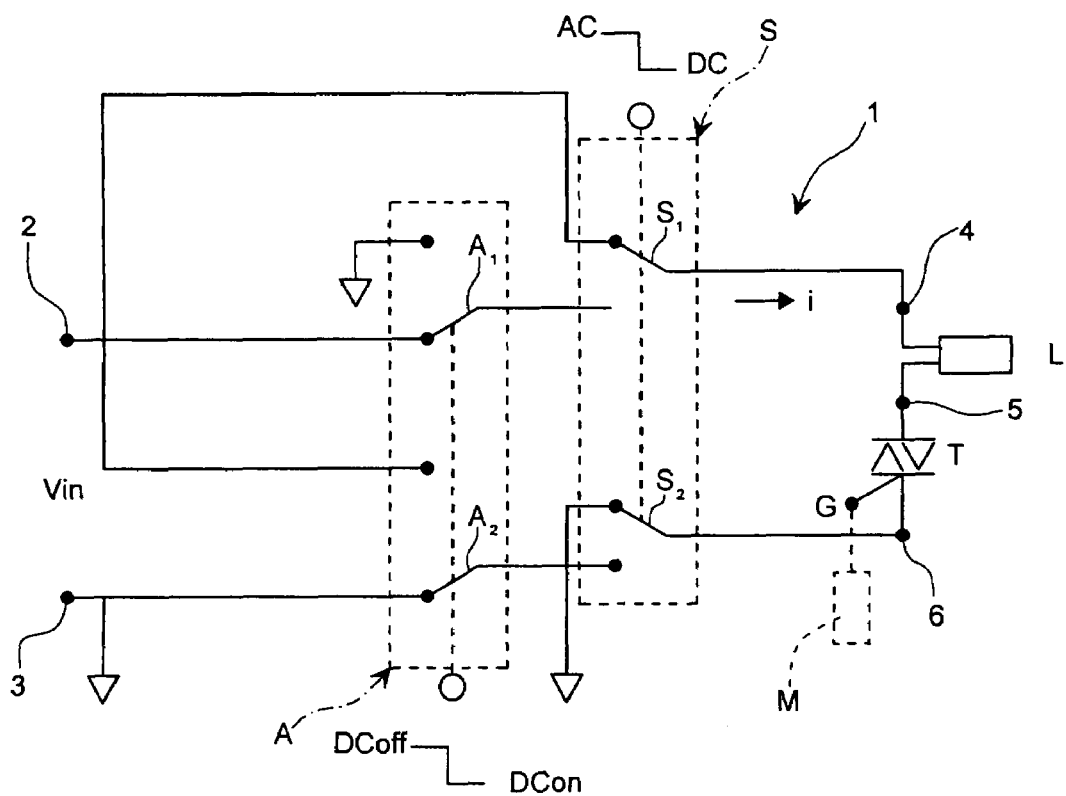
FIG. 1 shows a first embodiment of the control device according to the present invention in the "AC solenoid" configuration.

A simplified electric diagram of a control device 1 according to an embodiment of the invention is shown in FIG. 1.

The mains supply port of said device 1 is formed by two input or power supply terminals 2 and 3, the latter being grounded. The input voltage Vin may be both low voltage AC (24 Vac) and battery DC (9 Vdc or 12 Vdc) or it may be provided by solar cells.

The output port is formed by two output or load terminals 4 and 5, to which the terminals of a driven solenoid L, which may be AC or DC bistable, are connected.

A triac device T having a gate G controlled by appropriate means, e.g. by a microprocessor M, is connected in series to the driven solenoid L by means of terminals 5 and 6. A current i may flow through the series formed by said driven solenoid L and by said triac T.

At the ends of the above-said series formed by the driven solenoid L and the triac T there are two switches S1, S2 which are mechanically linked and controlled by a relay selector S switching between AC and DC, which may in turn be controlled by the above-said microprocessor.

In the device 1 there are two further switches A1, A2 which are mechanically linked and controlled by a reversing relay A between "On" and "Off", which may in turn be controlled by said microprocessor.

The positions which may be taken by the selector S, and accordingly by the switches S1, S2, are:

"AC" (FIG. 1): the switch S1 connects the power supply terminal 2 with the output terminal 4; the switch S2 grounds the terminal 6; with the selector arranged in this manner, the control device 1 is in a "DC solenoid" configuration;

"DC" (FIGS. 3, 4): the switch S1 connects the switch A1 with the output terminal 5; the switch S2 connects the switch A2 with the terminal 6; with the selector S arranged in this manner, the control device 1 is in a "DC bistable solenoid" configuration.

The positions of the reversing relay A, and accordingly of the switches A1 and A2, affect the behaviour of the device 1 only if the latter is configured "for DC bistable solenoid". Said positions are:

"DC On" (FIG. 3): the switch A1 connects the input terminal 2 with the switch S1, if it is set in a "DC" position; the switch A2 connects the input terminal 3 with the switch S2, if it is set in a "DC" position; in this manner, the series formed by the driven solenoid L and by the triac T is polarised with a voltage Vin>0;

"DC Off" (FIG. 4): the switch A1 connects the ground with the switch S1, if it is set in a "DC" position; the switch A2 connects the input terminal 2 with the switch S2, if it is set in a "DC" position; in this manner, the series formed by the driven solenoid L and by the triac T is polarised with a voltage Vin<0.

Before disclosing the operation of the device as a whole, it appears useful to describe the way the triac T and the microprocessor M operate.

As far as the triac T is concerned, if the gate G is enabled with a negative voltage, e.g. equivalent to −3V, the triac T is switched "into conduction" (it may also be said "it is turned on"), and allows the flow of current i, behaving as a closed switch. When the gate G is no longer enabled, the triac T is "driven out of conduction": the triac T continues to conduct until the current i goes to zero. When the current i is zero, the triac T is "turned off" and no longer allows the flow of current, behaving as an open switch, until the gate G is enabled again by a voltage of −3V.

The microprocessor M controls in turn the operations of the device 1. It is capable of recognising whether the power supply voltage Vin is direct or alternating, as well as receiving further information given by the user or by prerecorded programs in a memory associated to the microprocessor. Information concerning the type of driven solenoid L (whether DC bistable or AC) must be included among this information. Depending on the information received and by the effect of its programming, the microprocessor controls the gate G of the triac T (and subsequently the current i to the driven solenoid L), the selector S (and subsequently the power supply voltage of the solenoid L, whether direct or alternating) and the reversing relay A (and subsequently the voltage sign at the ends of the series formed by the solenoid L and by the triac T).

Figure 2:
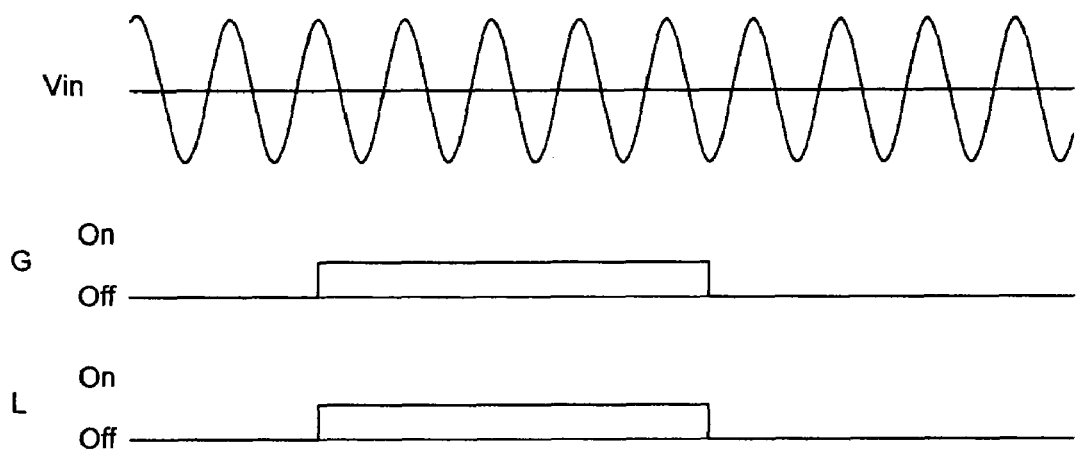
FIG. 2 shows the time diagram of the operation of the device in FIG. 1 in the "AC solenoid" configuration.

The operation of the device 1 configured "for AC solenoid" results from FIGS. 1 and 2.

An alternating voltage Vin, typically 24V, is applied to the input terminals 2, 3. The selector S is in an "AC" position; the position of reversing relay A is uninfluential. The series formed by the solenoid L and the triac T is supplied with alternating voltage but there is no current flow as long as the gate remains disabled. When the gate G is enabled, the triac T is switched into conduction and non-zero current i flows through the driven solenoid L which is therefore excited. When the gate G is disabled, the current i continues to flow until the alternating power supply voltage goes from a positive value to zero; at this point the current i goes to zero, the triac T is turned off and the solenoid L is de-excited. Being the power supply voltage Vin alternating, the triac T is turned off within a half cycle.

The time diagram of the operation of the control device in the "AC solenoid" configuration is shown in FIG. 2.

Figure 3:
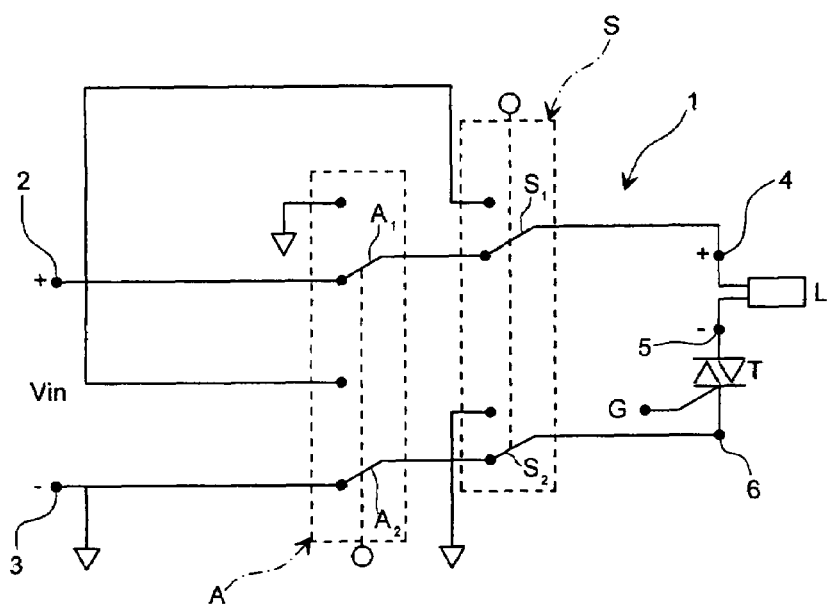
FIG. 3 shows the control device in FIG. 1 in a first state in the "DC bistable solenoid" configuration.
Figure 4:
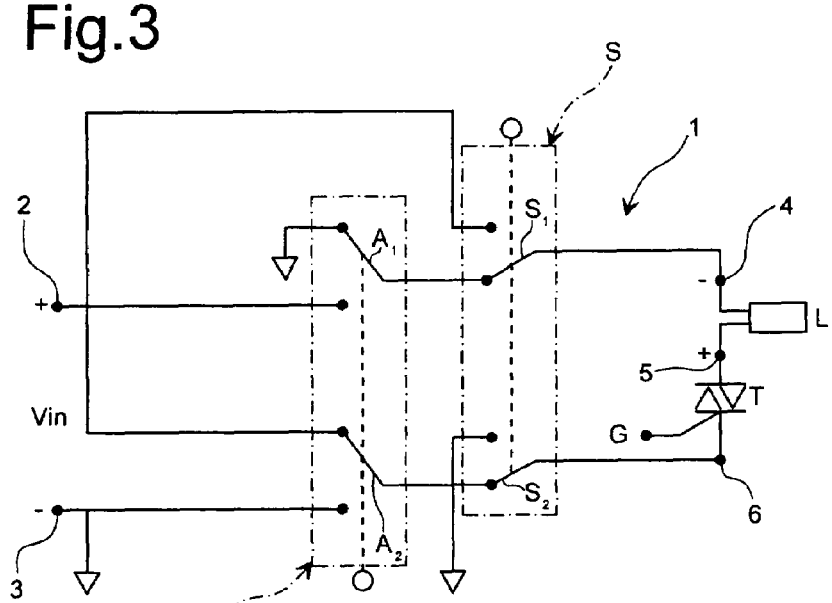
FIG. 4 shows the control device in FIG. 1 in a second state in the "DC bistable solenoid" configuration.
Figure 5:
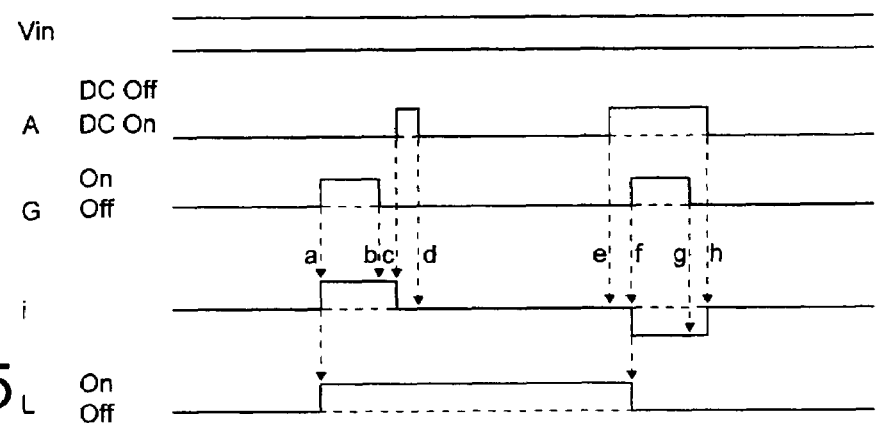
FIG. 5 shows the time diagram of the operation of the device in FIG. 1 in the "AC solenoid" configuration.

The operation according to the "DC bistable solenoid" configuration resulting from FIGS. 3-5 is described hereinafter. Firstly, there is described the transition of the driven solenoid L from the "Off" state to the "On" state.

The input terminals 2, 3 are supplied with direct voltage Vin. The selector S is in a "DC" state (FIG. 3) and the reversing relay A is in a "DC On" state. The series formed by the solenoid L and the triac T is supplied with positive direct voltage, but there is no flow of current until the gate of the triac T remains disabled.

When the microprocessor M imposes a negative voltage −3V to the gate G of the triac T (transition a in FIG. 5), the latter switches into conduction and allows the flow of a current i>0 in the driven solenoid L; such a current i>0 is sufficient to induce the driven solenoid L to change state and switch to an "On" state.

Once the controlled solenoid L is switched to an "On" state, the latter no longer needs to be supplied with power. The microprocessor M thus disables the gate G of the triac T (transition b in FIG. 5), but the triac T continues to conduct, because the current i that flows through it is direct and different from zero.

The microprocessor then induces the reversing relay A to switch to a "DC Off" position (transition c in FIG. 5), thus configuring the device 1 as in FIG. 4. The terminals 4, 6 of the series formed by the solenoid L and by the triac T are rapidly polarised at the negative voltage −Vin and in this transition the current i goes to zero, thus causing the switching off of the triac T, which prevents the flow of further current i in the driven solenoid L. Then, the microprocessor induces the reversing relay A to switch back to the "DC On" position (transition d in FIG. 5). In this condition, the control device 1 does not consume energy.

When it is required for the driven solenoid L to switch to an "Off" state, the reversing relay A is switched in a "DC Off" state (transition e in FIG. 5).

Then, the microprocessor enables the gate G of the triac T (transition f in FIG. 7), which, therefore, switches into conduction and allows the flow of a current i<0 in the driven solenoid L. The flow of a sufficient current i<0 induces the solenoid L to switch to an "Off" state.

At this point, the triac T must still be switched off to avoid a unnecessary consumption of energy.

Firstly, the microprocessor disables the gate G of the triac T (transition g in FIG. 5), but the current i<0 continues to flow in the series formed by the driven solenoid L and the triac T.

Finally, the microprocessor (transition h in FIG. 5) induces the reversing relay A to switch to a "DC On" state: the terminals 4, 6 of the solenoid-triac series are rapidly polarised at a positive voltage, so that the current i goes to zero, thus forcing the switching off of the triac.

Figure 6:
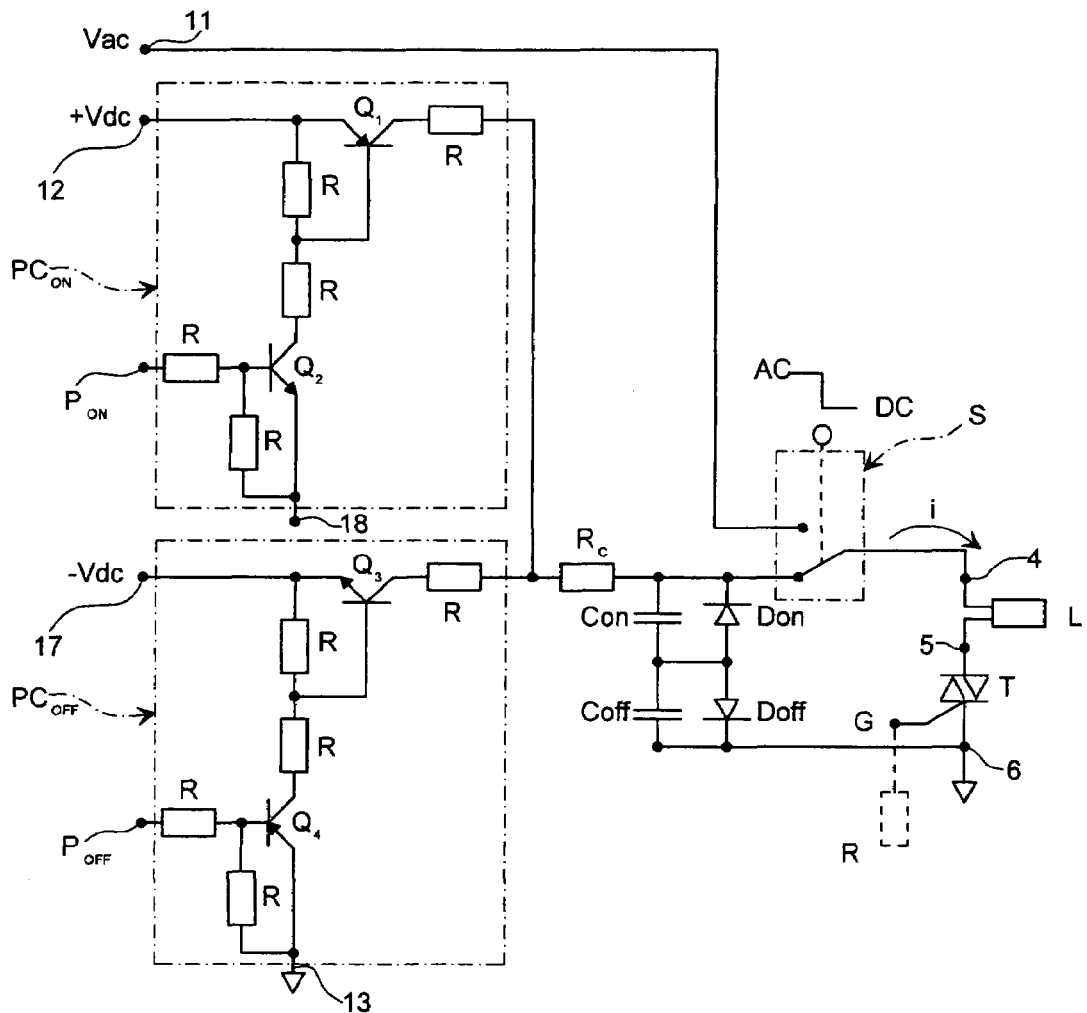
FIG. 6 shows the circuit diagram of a second embodiment of the control device according to the present invention.

A second embodiment is shown in FIG. 6 and requires a bipolar power supply source if it is used to control a DC bistable solenoid, but allows to merely use electronic components instead of the electromechanical reversing relay A.

There are five input terminals:

an input terminal 11 for the AC power supply;

an input terminal 12 for a DC power supply with a constant positive potential Vdc>0;

a ground input terminal 13;

an negative input terminal 17 for the DC power supply with a constant positive potential −Vdc<0;

a negative potential terminal 18 (for example −3V).

The output or load terminals 4, 5 are connected to the DC bistable or AC driven solenoid L, in series to a triac T with a gate G controlled by a microprocessor M. The gate G requires a negative activation voltage, for example of −3V.

The terminal 4 is connected to a switch S1, controlled by a selector S that allows to set the control device 1 for DC or AC power supply.

Two precharge circuits PCon and PCoff are connected to two terminals Pon and Poff, connected to two outputs of the microprocessor M. Pon and Poff require a voltage of −3V to activate the precharge circuits PCon and PCoff. In series to the precharge circuits PCon and PCoff there is a resistor Rc.

Downstream of resistor Rc and of selector S there is the series formed by the driven solenoid L and the triac T; such a series is placed in parallel to two capacitors Con and Coff, each of which is in parallel to diodes Doff and Don, arranged at an inverted polarity as in FIG. 6.

If the power supply is alternating, the circuit operates as in the previous embodiment. Therefore, it is considered useful to only disclose the operation with a DC bistable solenoid, i.e. in the configuration shown in FIG. 6.

Figure 7:
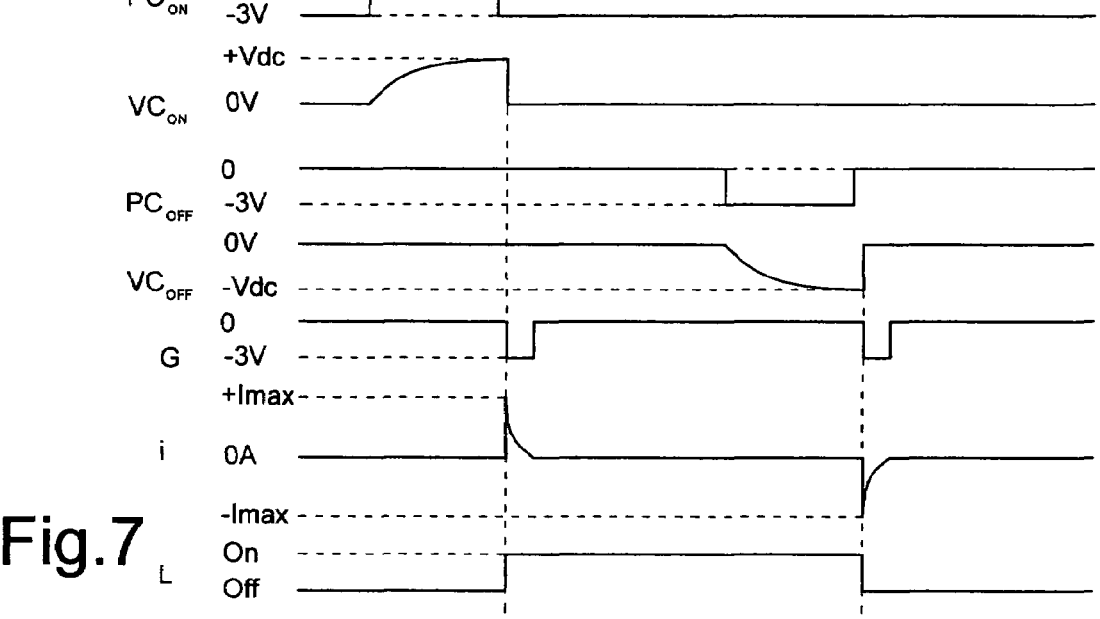
FIG. 7 shows the time diagram of the operation of the control device in FIG. 6 according to the "DC bistable solenoid" configuration.

Following the time diagram in FIG. 7, it may be noted that, by exciting the Pon terminal of the precharge circuit PCon, the conduction of the transistor Q1 is forced, the latter behaving as a closed switch and allowing to charge the capacitor Con. Obviously, this must occur when the triac T is turned off and the transistor Q3 is closed.

At the time the gate G of the triac T is enabled, the capacitor Con discharges and imposes a current i>0 in the driven solenoid L, which switches to an "On" state. Unlike the previous embodiment, in this case the current i naturally goes to zero, as an effect of the discharge of the capacitor.

To switch the driven solenoid L back to the "Off" state, it is required to excite the precharge terminal Poff of the precharge circuit PCoff, which negatively charges the capacitor Coff. By enabling the gate G of the triac T, the discharge of the capacitor Coff is then forced, which imposes a current i<0 in the driven solenoid L, as shown in FIG. 7.

To obtain a higher current both for On and Off, the voltages +Vdc e −Vdc need to be increased. On the basis of the available battery voltage Vbat, an option is to use a voltage multiplier MT such as that shown in FIG. 8, using inverter amplifiers I, capacitors C, diodes D, resistors R and a input transistor Q and in which a branch MT' generates the voltage +Vdc and the other branch MT" generates the voltage −Vdc.

"Molt" is a command which enables the multiplication and must be applied at the same time respectively to the precharge controls Pon and Poff.

Figure 8:
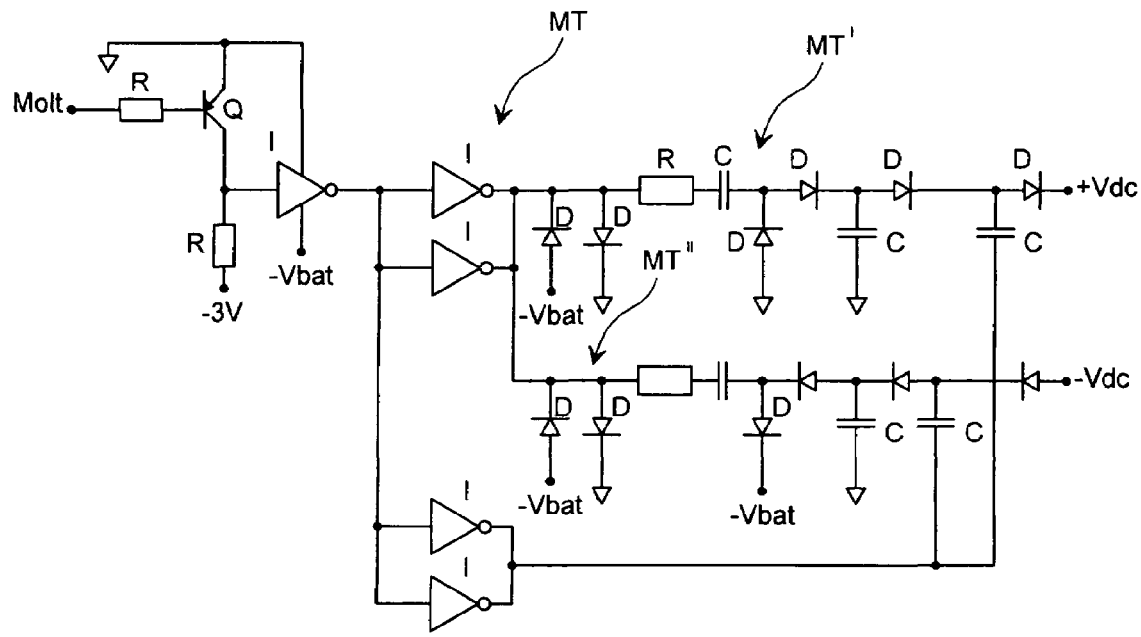
FIG. 8 shows the circuit diagram of a voltage multiplier which may be used to increase the input DC voltage of the control device in the DC operation.
Figure 9:
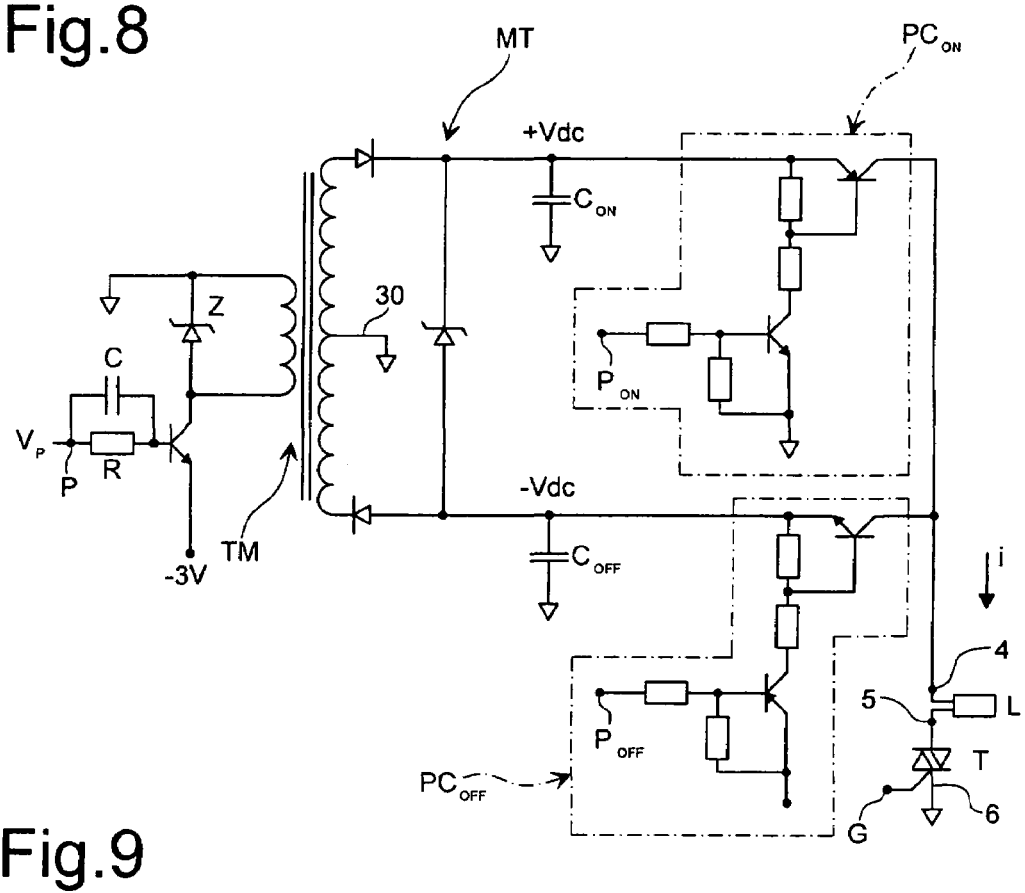
FIG. 9 shows the circuit diagram of a transformer to increase the input DC voltage of the control device in the DC operation.

A voltage multiplier circuit alternative to that in FIG. 8 is shown in FIG. 9 and comprises a step-up transformer TM, the secondary of which is provided with a central tap 30 at ground potential.

The primary of the transformer M is connected to an inlet circuit which comprises a Zener diode Z, a transistor Q, a resistor R and a capacitor C and is supplied at terminal P with a variable duty-cycle square wave voltage Vp, whereas the secondary provides for the simultaneous charge of the capacitors Con and Coff.

Enabling Pon, the capacitor Con may discharge on the solenoid L concurrently with the enabling of the gate G of the triac T, by activating the solenoid itself.

Enabling Poff, the capacitor Coff may discharge on the solenoid L concurrently with the enabling of the gate G of the triac T, by inactivating the solenoid itself.

Furthermore, whereas with the multiplier in FIG. 8 applied to the circuit in FIG. 6 it is required to wait for up to 10 seconds, for example, before being able to activate the solenoid and for a similar time to inactivate it for a total time of 20 seconds for a complete cycle, the circuit with the transformer in FIG. 9 halves the control times of the solenoid, by simultaneously charging Con and Coff in 10 seconds.

The invention claimed is:

1. A control device for driving AC solenoids or DC bistable solenoids, characterised in that it comprises power supply terminals which may selectively be connected to an AC or DC voltage source, load terminals which may be connected to a driven solenoid, at least one triac device connected in series to said driven solenoid, means which may be controlled to switch on said triac and selector means interposed between said power supply terminals and said load terminals to switch the control device between a first configuration suitable for the power supply of an AC solenoid and a second configuration suitable for the power supply of a DC bistable solenoid and inverter means which may be controlled to invert the voltage polarity at the load terminals with respect to that applied at the power supply terminals when the control device is selected in said second configuration.

2. The device according to claim 1, characterised in that said selector means may be switched between a first direct connection position of said power supply terminals with the series of said solenoid and said triac to carry out said first configuration and a second connection position of said power supply terminals with the series of said solenoid and said triac through said inverter means to carry out said second configuration.

3. The device according to claim 1, characterised in that said selector means are of the relay type.

4. The device according to claim 1, characterised in that said inverter means are of the relay type.

5. The device according to claim 1, characterised in that said inverter means consist of precharge circuits which may be enabled by corresponding controls for the precharge of the corresponding capacitors which may be discharged separately on said solenoid for the generation of inverted polarity currents by switching on said triac.

6. The device according to claim 1, characterised in that it comprises a voltage multiplier adapted to increase the DC power supply voltage with respect to a battery voltage.

7. The device according to claim 5, characterised in that said voltage multiplier may be enabled with a command applied at the same time to separate precharge controls of said precharge circuits and comprises a branch MT' for the generation of the voltage +Vdc and another branch MT" for the generation of the voltage −Vdc.

8. The device according to claim 5, characterised in that said voltage multiplier comprises a step-up transformer, which has a primary winding connected to an input terminal supplied with a variable duty-cycle square wave voltage and a secondary winding connected to said capacitors under the control of said precharge circuits and provided with a grounded central tap (30).

9. The device according to claim 6, characterised in that it comprises a microprocessor for the control of said means for the switching on of the triac, of said selector means and of said inverter means.

* * * * *